March 7, 1933. M. H. ACKERMAN 1,900,849
SEAL
Filed July 24, 1931 3 Sheets-Sheet 1
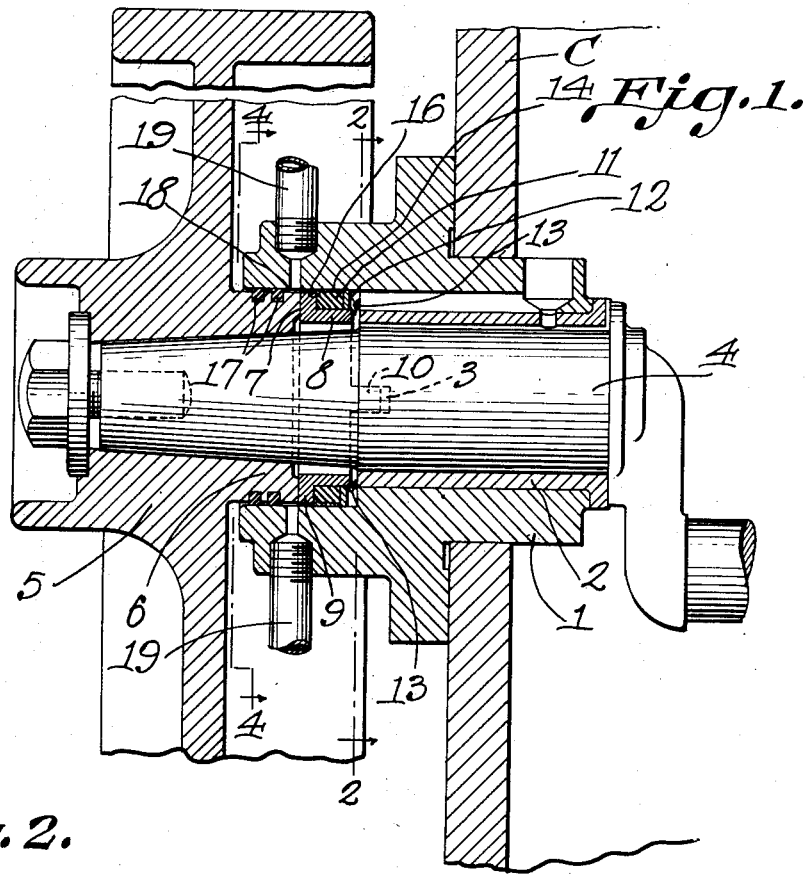
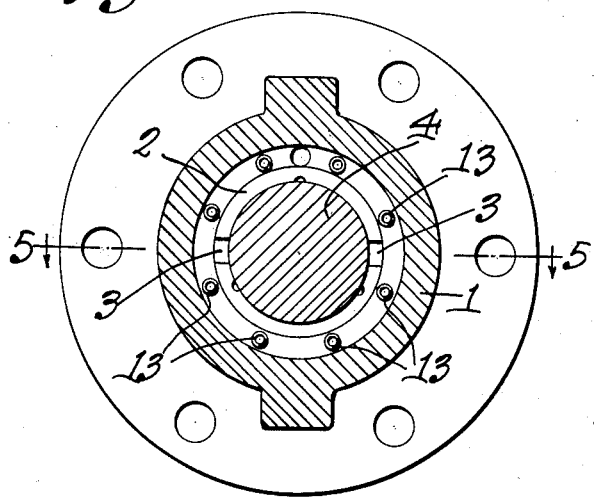
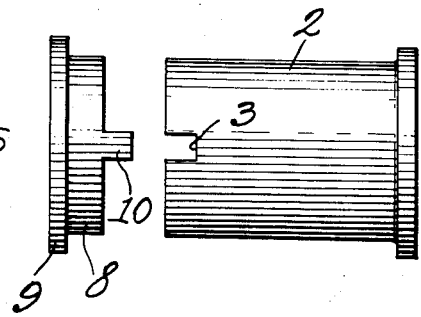
M. H. Ackerman, Inventor
By C. A. Snow & Co.
Attorneys.

March 7, 1933.     M. H. ACKERMAN     1,900,849
SEAL
Filed July 24, 1931     3 Sheets-Sheet 2
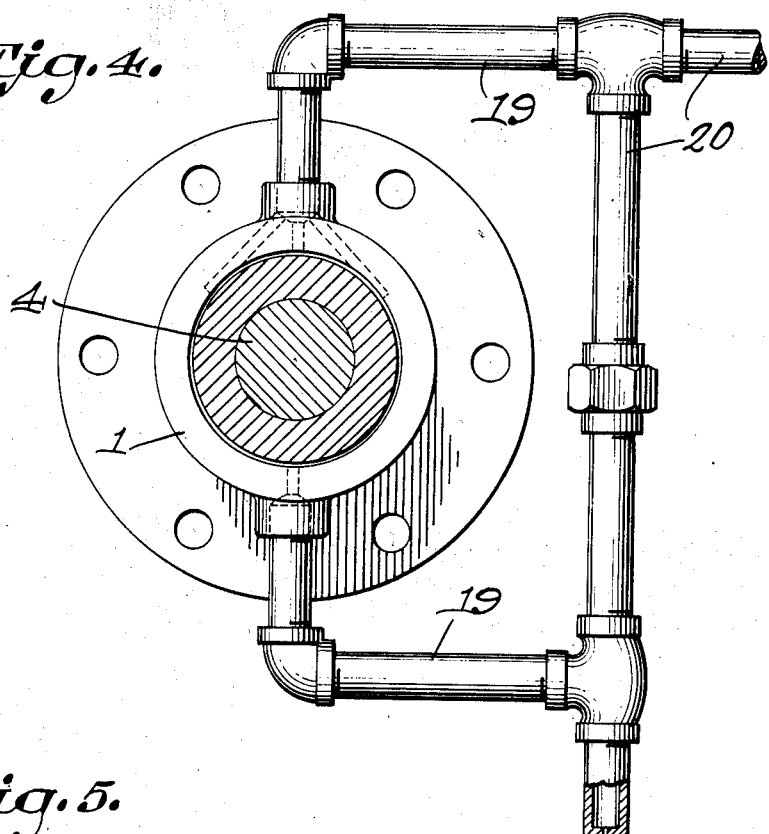
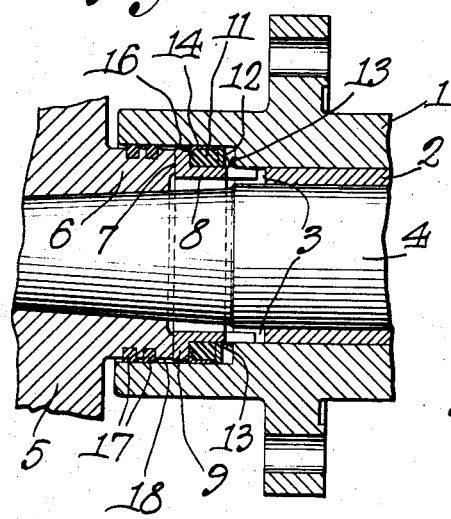
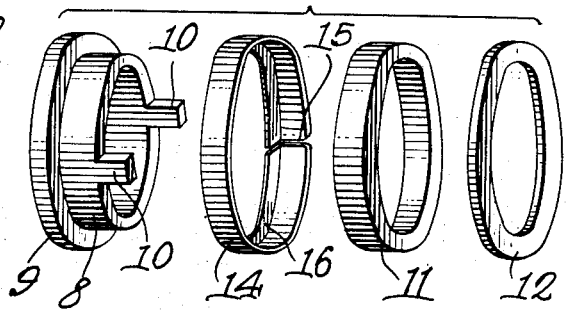
M. H. Ackerman, Inventor
By C. A. Snow & Co.
Attorneys March 7, 1933.    M. H. ACKERMAN    1,900,849
SEAL
Filed July 24, 1931    3 Sheets-Sheet 3

M. H. Ackerman, Inventor
By C. A. Snow & Co.
Attorneys

Patented Mar. 7, 1933

1,900,849

UNITED STATES PATENT OFFICE

MICHAEL H. ACKERMAN, OF MANSFIELD, OHIO, ASSIGNOR OF ONE-HALF TO LOUIS C. SICKEL, OF CALEDONIA, OHIO

SEAL

Application filed July 24, 1931. Serial No. 552,968.

This invention relates to a seal designed primarily for use in connection with the compressor shaft of refrigerating apparatus.

The object of the present invention is to provide a mechanical seal that will remain effective under all conditions. Heretofore two general types of seals have been employed in an effort to prevent leakage about the shaft of refrigerating apparatus,—the bellows type and the rotating type.

In the bellows type of shaft seal all the rotational strains are carried by the frail bellows. The structure of the bellows seal is such that it must be interposed between the bearing structure and the pulley or fly wheel. As the space required for the seal structure is considerable, the revolving pulley or fly wheel weight is carried too far away from the bearing support and this tends to set up a gyrating motion which destroys the gas tight effectiveness of the running contact of the sealing surface.

The other type of seal used to prevent leakage is of the rotating type which seals on the shaft. This is intended for installation in the space usually provided for the conventional stuffing box. With seals of this type a spring compressed gum ring within the seal is used to prevent leakage along the shaft, while the rotational strains are carried by the frictional contact of the gum ring on the periphery of the shaft.

A third type of floating compensating seal, such as shown for example, in my co-pending applications, #240,225, filed January 28, 1928; #274,586, filed May 2, 1928, and #297,056, filed August 2, 1928, comprises a structure which does not rotate with the shaft extending therethrough, and utilizes a floating seal ring seated in a flexible gasket whereby a wobble action of the ring, due to contact with the gyrating end of a wheel hub or the like, is permitted and a gas tight seal is insured at all times between the seal ring and the end of the hub or the like cooperating therewith.

This improved type eliminates the stuffing box and the floating compensator ring absorbs the gyrating action of the pulley or fly wheel on the sealing surfaces. By providing a bearing support within ¾" of the pulley or fly wheel hub shaft gyration is reduced to a minimum, and all the shaft bearings can be lubricated by crank case splash. In construction it lends itself to positive anchorage against rotation, and permits the use of packing of the "hydraulic cup" type because the ring is not dependent upon the packing to hold it frictionally tight against rotation.

As some refrigerants in daily use act as quick solvents of gum packing, and the mineral oils used for lubrication tend to destroy the frictional contact which might hold the seal against movement, it is of vital importance that a practical seal should lend itself to splining i. e., the use of a projecting portion on one part slidable longitudinally in another part, in order to prevent rotation of the seal ring and permit use of hydraulic packing, which offers little frictional resistance against rotational strains. It is an object of the present invention to meet this requirement.

There are other objections to rotating seals which do not permit splining or doweling against rotation. For example, it has been found in practice that when a refrigerating machine has been idle for several hours, accumulating pressures force the sealing surfaces in solid contact, leaving little if any lubrication between them. The starting and frictional stresses created by the conditions just described by the softening of gum packing on seals rotating with the shaft, gradually breaks down the frictional resistance of the packing to prevent rotation of the seal, causing the seal to rotate on the packing and not on the running sealing surface,—a condition that quickly causes failure of the seal and leakage of the refrigerant. The present invention has for an object the elimination of these faults.

A further objection to seals of old types which rotate with the shaft, is their undesirable location in the spaces provided for the conventional stuffing boxes. The fly or pulley wheel must be removed, the connecting rods disconnected from the shaft and the crank shaft partly removed, in order to slip the rotating seal into an operative location between the pulley wheel bearing and stuffing box. If the seal is defective or repairs are required this procedure must be repeated. Obviously this assembly is expensive. Another object of this invention is to avoid this trouble and expense.

A further object is to provide improved means for using gum, or gum impregnated packing, on mechanical seal rings. Experience with seals designed to seal on a shaft with a gum ring, has disclosed the fact that after a few days the gum ring adheres to the shaft firmly. It then resists longitudinal motion along the shaft in a direction along the axis of rotation, so that when the shaft is moved, or receives an end thrust, which frequently happens when the compressor is directly connected to a motor, the seal ring becomes dislodged from its proper location and remains so, due to the tendency of the gum ring packing to stick to the shaft; and once the two running sealing surfaces are forced apart, the escaping gas under pressure injected between the two surfaces contributes to a complete failure.

The foregoing objections are avoided by the present invention wherein the tendency of the packing ring to adhere to the shaft is overcome by the application of a metal band upon the inner or outer periphery of the gum ring of the seal, this location depending on the type of seal ring. It has been found that a durable seal which will adjust itself automatically, under all named conditions, to longitudinal shaft motion, can be made by placing a metal band, approximately .003 of an inch in thickness about the periphery of the gum portion of a seal ring assembly, so that it will make a gas tight seal in the bearing recess, a metal to metal contact on the bearing walls and running sealing surfaces being provided which greatly reduces friction.

Another object is to provide a gum ring in which the area exposed to pressure to be held is so proportioned that variable working pressures will exert a radial expansion effect upon the metal banded gum ring just sufficient to hold the seal ring gas tight under all pressures but permit free longitudinal motion.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings the preferred form of the invention has been shown. In said drawings:

Figure 1 is a section through a bearing of a refrigerating apparatus equipped with a seal ring having the present improvements.

Figure 2 is a section on line 2—2, Figure 1, the tang of the seal ring being removed, to show the spline.

Figure 3 is a side elevation of the bushing of the bearing shown in Figure 1 and of the main ring of the seal, showing one of the tangs and the spline recess provided therefor.

Figure 4 is a section on line 4—4, Figure 1.

Figure 5 is a section on line 5—5, Figure 2.

Figure 6 is a perspective view of the seal ring, the parts being shown separated.

Figure 7:
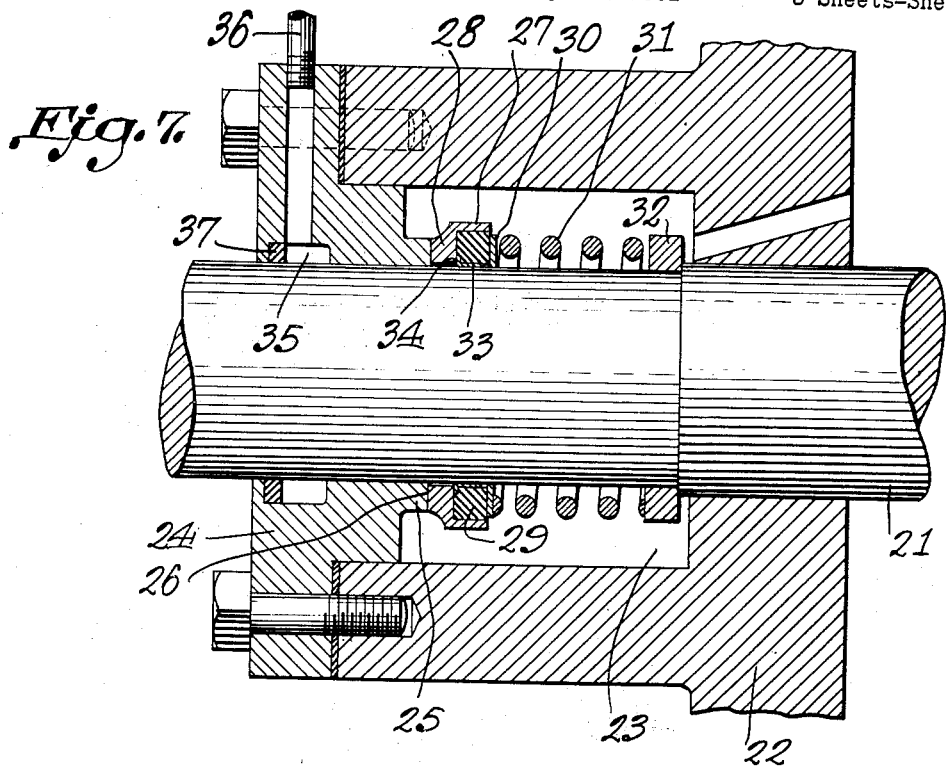
Figure 7 is a section showing another type of seal ring equipped with the present improvements.

Referring to the figures by characters of reference, 1 designates a bearing member which can be formed with or attached to the crank case C of a refrigerating apparatus or to any other structure through which a shaft is to be extended and which is to be kept gas-tight and maintain other than atmospheric pressures in the casing. This bearing member has a bushing 2 seated therein and, as shown particularly in Figure 3, the outer end of the bushing is formed with spline slots 3.

A shaft 4 is mounted for rotation in the bushing and, in the structure shown in Figure 1, a flywheel 5 is mounted on and secured to the outer end portion of this shaft. This flywheel has a hub 6 extending inwardly therefrom providing an annular bearing surface 7 for contact with the seal ring constituting the present invention.

The seal illustrated in Figures 1 to 6 inclusive includes a main ring 8 provided, at one edge, with an annular flange 9 while, from its opposite edge, are extended tangs 10 which are positioned to freely enter the slots 3. This ring 8 is spaced from the shaft 4 but has its flanged side formed with a flat surface which will make a tight sealing fit against the surface 7 of hub 6.

A resilient deformable ring 11 formed preferably of gum or soft rubber is fitted against the flange 9 and extends around ring 8. This resilient ring 11 is in turn engaged by a metal washer 12 adapted to slide on the tangs 10 and ring 8 and to be pressed against the ring 11 by springs 13 which are seated in bores provided therefor in the bearing member 1. Thus the seal ring is pressed at all times against the bearing surface 7 and at the same time the ring 11 is deformed and expanded along radial lines thereby to tightly grip ring 8 and to press toward the wall of the bearing member in which it is seated. This sealing action is sufficient to prevent leakage of air into casing C when a subatmospheric pressure is produced therein.

For the purpose of preventing the ring 11 from adhering to the wall of the bearing member 1 so that it will not interfere with the longitudinal movement of the seal under the action of internal pressure and the springs 13, a ring or band 14 formed of very thin metal is extended around ring 11. This ring or band is preferably split as shown at 15 and is provided with an inwardly extending flange 16 which facilitates the assembling of the parts and holds the metal ring or band properly positioned relative to the ring 11. As this metal ring or band is very thin it will flex with the surface of ring 11 and will fit snugly against the surface of the bearing member so that when ring 11 is expanded radially under pressure a tight sealing fit will be formed between ring or band 14 and the wall of member 1. Should the ends of the ring or band 14 be spaced apart while the seal is under pressure, a portion of the ring 11 will expand between said ends to prevent leakage.

As a further safeguard against the escape of gas to the atmosphere if, by any chance, it should get past the seal, it is designed to provide hub 6 with one or more packing rings 17 which, with the seal ring already described, provides an annular space 18 about the hub. Communicating with this space are branches 19 of a vent pipe 20 which leads to a point outside of the structure in which the refrigerating apparatus is located.

Figure 8:
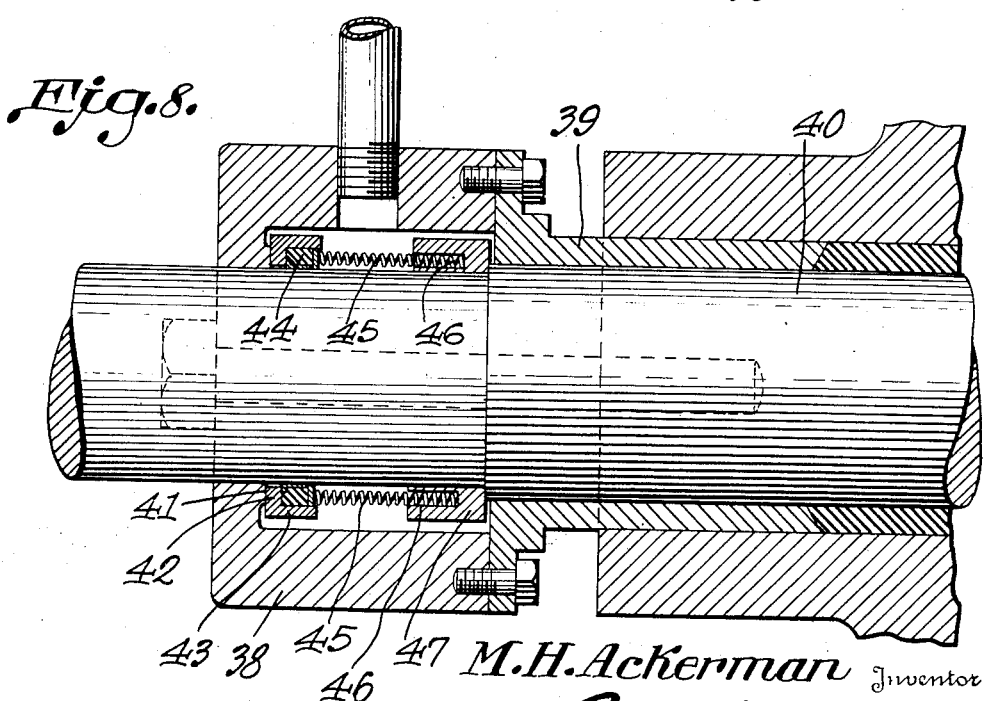
Figure 8 is a section through a packing gland having combined therewith a seal ring such as shown in Figure 7.

In Figures 7 and 8 the present improvements have been shown applied to a seal of the type adapted to rotate. In Figure 7, for example, shaft 21 is rotatably mounted in a bearing member 22 in which is formed a recess 23. This recess is adapted to be closed by a cap 24 having a hub portion 25 extending into the recess and providing a smooth bearing surface 26 with which the seal is adapted to cooperate. The main ring of the seal has been indicated at 27 and has an inwardly extended annular flange 28. The outer surface of this flange is flat and smooth and forms a sealing contact with the surface 26 of hub 25. The deformable ring 29 of rubber is seated within ring 27 and bears against flange 28 and is adapted to be placed under compression by a metal washer 30 which, in turn, receives thrust from a spring 31. This spring is fitted loosely on the shaft 21 and bears at one end against a collar 32 carried by the shaft.

For the purpose of preventing ring 29 from adhering to shaft 21 and shifting therewith, a ring or band 33 formed of very thin metal is seated snugly within ring 29. This ring or band, like the ring or band 14, has an annular flange 34 whereby it is held properly assembled with the ring 29. Obviously, when ring 29 is placed under compression, it will be expanded radially both outwardly and inwardly, causing the ring or band 33 to bind with a sealing fit upon the shaft 21.

For the purpose of insuring against escape of gas into the surrounding atmosphere if, through any unforeseen cause, it should escape past the seal, an annular recess 35 can be formed in cap 24 and provided with a vent pipe 36. A packing ring 37 is seated in this recess and is adapted to fit snugly upon the shaft.

In the form of seal shown in Figure 8 a cap 38 is connected to a gland 39 in which the shaft 40 is mounted for rotation. This cap has a hub portion 41 extending inwardly therefrom making a working, sealing fit against the flange 42 of the main ring 43 of the seal which is arranged within the cap. This ring is constructed the same as that disclosed in Figure 7 but instead of utilizing a single coiled spring for holding the deformable ring 44 under pressure, a number of coiled springs 45 can be used, these being seated in bores 46 provided for them in a collar 47 which is mounted on and rotates with the shaft 40.

It is to be understood, of course, that in all forms of the ring illustrated and described, the sealing ring is maintained in proper sealing position primarily by the pressure of gas from within the structure in which the shaft 1 is mounted. The springs are merely utilized as supplemental means for exerting sufficient pressure upon the ring to hold it against admission of air past the seal should there be a subatmospheric pressure back of the seal instead of a pressure greater than atmospheric.

It will be noted furthermore, that the relatively thin metal ring or band used as a part of the sealing ring is equally efficient whether it be mounted on the outer circumference or the inner circumference of the deformable ring, the location being dependent, of course, upon the position of the seal relative to the adjacent parts.

The metal ring or band is slightly flanged to make assembly easy and prevent dislocation. The metal is just thick enough to handle nicely and permit the gum to fill in snugly between the ends of the band at the split therein. The band also protects the gum ring from gas and mineral oil action.

What is claimed is:

1. A seal of the class described including a ring having an annular flange providing a bearing and sealing surface, a deformable ring carried by the main ring and adapted to be expanded radially when subjected to compression, and a relatively thin metal band engaging the deformable ring and having means adapted to engage said ring and hold the band assembled therewith, said band being split transversely and being expansible to form a sealing, working fit against the structure contacted thereby when the deformable ring is subjected to pressure and expanded radially.

2. The combination with a bearing element, a shaft journaled in said element, and a member secured to and rotatable with the shaft, said member having a bearing face, of a seal including a main ring having a flange forming a sealing, working fit upon said face, a deformable ring carried by the main ring and expansible radially when subjected to compression, and a relatively thin metal split band carried by the deformable ring and split transversely to provide an expansible working, sealing fit circumferentially of the seal when the deformable ring is expanded radially under pressure.

3. The combination with a bearing element having a slot extending into one end, a shaft mounted for rotation in said element and a member rotatable with the shaft and having an annular bearing surface, of a seal including a main ring having a flange forming a sealing, working fit upon said annular bearing surface, a tang extending from and integral with said ring and slidable longitudinally within the slot in the bearing member for holding the ring against rotation with the shaft, a deformable ring carried by the main ring and expansible radially when subjected to compression, and a relatively thin metal band carried by the deformable ring and split transversely to provide an expansible working, sealing fit circumferentially of the seal when the deformable ring is expanded radially under pressure.

In testimony that I claim the foregoing as my own, I have hereto affixed my signature.

MICHAEL H. ACKERMAN.